(12) United States Patent
Hoshikawa

(10) Patent No.: US 9,764,504 B2
(45) Date of Patent: Sep. 19, 2017

(54) INJECTION MOLDING MACHINE PROVIDED WITH ELEVATION TYPE SIGNAL LAMP

(71) Applicant: FANUC Corporation, Yamanashi (JP)

(72) Inventor: Shintaro Hoshikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

(21) Appl. No.: 14/682,735

(22) Filed: Apr. 9, 2015

(65) Prior Publication Data

US 2015/0290853 A1    Oct. 15, 2015

(30) Foreign Application Priority Data

Apr. 10, 2014  (JP) .................................. 2014-081392

(51) Int. Cl.
| | |
|---|---|
| B29C 45/17 | (2006.01) |
| F21W 111/00 | (2006.01) |
| F21W 131/403 | (2006.01) |
| F21V 21/14 | (2006.01) |
| G08B 5/36 | (2006.01) |
| F21V 23/00 | (2015.01) |

(52) U.S. Cl.
CPC .......... *B29C 45/1774* (2013.01); *B29C 45/17* (2013.01); *F21V 21/14* (2013.01); *F21V 23/00* (2013.01); *F21W 2111/00* (2013.01); *F21W 2131/403* (2013.01); *G08B 5/36* (2013.01)

(58) Field of Classification Search
CPC ..... B29C 45/17; B29C 45/1774; F21V 21/14; F21V 23/00; G08B 5/36; F21W 2111/00; F21W 2131/403

USPC .... 116/202, 26–27, 29–30, DIG. 5, DIG. 15; 362/418
See application file for complete search history.

(56) References Cited

U.S. PATENT DOCUMENTS

| | | | | |
|---|---|---|---|---|
| 2,367,727 A | * | 1/1945 | McWane | B22D 17/26 164/151.2 |
| 2,654,877 A | * | 10/1953 | Sparaco | B60Q 7/00 116/50 |
| 2,779,013 A | * | 1/1957 | Chotro | G01G 19/12 116/202 |

(Continued)

FOREIGN PATENT DOCUMENTS

| | | |
|---|---|---|
| DE | 1755279 A | 1/1972 |
| DE | 202005006086 U1 | 7/2005 |

(Continued)

OTHER PUBLICATIONS

Office Action in JP Application No. 2014-081392, mailed Sep. 13, 2016.

(Continued)

*Primary Examiner* — R. A. Smith
*Assistant Examiner* — Tania Courson
(74) *Attorney, Agent, or Firm* — Hauptman Ham, LLP

(57) ABSTRACT

An injection molding machine is provided with a signal lamp capable of displaying an operation state of the injection molding machine, and the signal lamp is elevated by operating an elevation unit attached to the injection molding machine. When the signal lamp is moved downward, it is possible to prevent a carrying object passing above the signal lamp from colliding with or contacting the signal lamp.

7 Claims, 4 Drawing Sheets

(56) References Cited

U.S. PATENT DOCUMENTS

| | | | | |
|---|---|---|---|---|
| 2,935,041 A * | 5/1960 | Rovere | ............... | F21V 35/00 |
| | | | | 116/202 |
| 3,253,304 A * | 5/1966 | Hatch | ............... | B22C 5/12 |
| | | | | 164/12 |
| 3,303,537 A * | 2/1967 | Mislan | ............... | B29C 45/7626 |
| | | | | 164/153 |
| 3,642,401 A * | 2/1972 | Wilson | ............... | B29C 45/7626 |
| | | | | 348/125 |
| 4,236,181 A * | 11/1980 | Shibata | ............... | G01V 8/20 |
| | | | | 250/559.39 |
| 4,841,364 A * | 6/1989 | Kosaka | ............... | B29C 45/7626 |
| | | | | 348/128 |
| 5,072,345 A * | 12/1991 | Goggia | ............... | F21S 8/022 |
| | | | | 362/153.1 |
| 5,398,026 A * | 3/1995 | Handsaker | ............... | B63B 45/04 |
| | | | | 114/343 |
| 5,611,616 A * | 3/1997 | Chandler | ............... | H02B 1/50 |
| | | | | 116/202 |
| 7,175,408 B2 * | 2/2007 | Watanabe | ............... | B29C 45/76 |
| | | | | 425/137 |
| 7,476,006 B2 * | 1/2009 | Hinds | ............... | F21S 8/028 |
| | | | | 362/153 |
| 7,651,242 B1 * | 1/2010 | Guerrant | ............... | A61G 5/10 |
| | | | | 362/131 |
| 8,393,750 B2 * | 3/2013 | Clement | ............... | F21V 21/22 |
| | | | | 116/202 |
| 2004/0005372 A1 * | 1/2004 | Shirahata | ............... | B25J 9/1676 |
| | | | | 425/135 |
| 2004/0009252 A1 * | 1/2004 | Reichstein | ............... | B29C 33/0083 |
| | | | | 425/143 |
| 2005/0028723 A1 * | 2/2005 | Ancel | ............... | B65G 69/2882 |
| | | | | 116/202 |
| 2005/0067128 A1 * | 3/2005 | Korneff | ............... | B22D 17/32 |
| | | | | 164/4.1 |
| 2007/0186161 A1 * | 8/2007 | Saito | ............... | G05B 19/054 |
| | | | | 715/700 |
| 2009/0092700 A1 * | 4/2009 | Yokoyama | ............... | B22D 17/32 |
| | | | | 425/135 |
| 2010/0053944 A1 * | 3/2010 | Yao-Lin | ............... | F21L 4/045 |
| | | | | 362/198 |

FOREIGN PATENT DOCUMENTS

| | | |
|---|---|---|
| DE | 102008055798 A1 | 5/2010 |
| JP | H09-141539 A | 6/1997 |
| JP | 2002-352386 A | 12/2002 |
| JP | 2003-177817 A | 6/2003 |
| JP | 2004-232372 A | 8/2004 |
| JP | 2007-55015 A | 3/2007 |

OTHER PUBLICATIONS

Office Action in JP application No. 2014-081392, mailed Apr. 19, 2016.

Office Action in DE Application No. 102015004439.7, dated Jun. 12, 2017.

* cited by examiner

INJECTION MOLDING MACHINE PROVIDED WITH ELEVATION TYPE SIGNAL LAMP

RELATED APPLICATIONS

The present application claims priority to Japanese Application Number 2014-081392, filed Apr. 10, 2014, the disclosure of which is hereby incorporated by reference herein in its entirety.

BACKGROUND OF THE INVENTION

1. Field of the Invention

The present invention relates to an injection molding machine, and particularly, to an injection molding machine provided with an elevation type signal lamp.

2. Description of the Related Art

An injection molding machine includes a signal lamp that notifies the state of the injection molding machine to a worker or a supervisor. Further, since the visibility is very important in the signal lamp, the signal lamp is provided on the surface of the injection molding machine in many cases. Further, there is a case in which a light emission portion of the signal lamp is provided at a high position from the top surface of the injection molding machine so that the worker may see the signal lamp at a far place. Meanwhile, in the installation place for the injection molding machine, a carrying machine such as a crane is used to carry a die used in the injection molding machine.

In the case where the installation place for the signal lamp exists on the carriage path of the crane, the installation height of the signal lamp may not be ensured enough to avoid the interference with a carrier or a carrying object frequently passing along the carriage path. This problem may be solved by separating the signal lamp whenever the interference object interfering with the signal lamp passes along the carriage path, but this is a troublesome work. Further, in the case where the installation place for the injection molding machine is changed, a construction of changing the height of the signal lamp may be conducted in order to avoid the interference between the signal lamp and other equipment or the like. Further, a technique of using a manipulation screen of the injection molding machine instead of the signal lamp is disclosed in Japanese Patent Application Laid-Open No. 9-141539. However, this technique is not suitable to visually recognize the operation state of the injection molding machine at a position distant from the injection molding machine.

SUMMARY OF THE INVENTION

An object of the invention is to provide an injection molding machine provided with a signal lamp that can be elevated manually or automatically in the height direction and capable of ensuring the height necessary for the signal lamp while avoiding the interference between the signal lamp and a peripheral object.

The injection molding machine of the invention is characterized in that an elevation unit capable of elevating the signal lamp is provided in the signal lamp so as to manually or automatically elevate the signal lamp.

The injection molding machine according to the present invention includes a signal lamp capable of displaying an operation state of the injection molding machine and an elevation unit which elevates the signal lamp, and the height of the signal lamp is changed by the elevation operation of the elevation unit.

The elevation unit may include a wire, a wire winding portion, an elevation member, and a sliding support member, one end of the wire may be fixed to the wire winding portion and the other end of the wire is fixed to the elevation member, the signal lamp may be fixed to the elevation member, the elevation member may be attached to the sliding support member so as to be elevated while being guided by the sliding support member, and the elevation member may be configured to be elevated while being guided by the sliding support member through a wire winding operation of the wire winding portion.

The wire winding portion may include a driving device and the wire winding operation is performed by the driving device.

The injection molding machine may further include a wire winding control unit which controls the wire winding operation through the driving device.

The injection molding machine may further include a detection unit which detects the approach of an interference object to the signal lamp, wherein the elevation member may be configured to be moved downward when the detection unit detects the approach of the interference object.

The wire winding control unit may be configured to elevate the elevation member to a height position in response to the operation state of the injection molding machine.

The injection molding machine may further include a height position detection unit which detects the height position of the signal lamp.

The signal lamp may be adapted to display the operation state of the injection molding machine by changing the color of a lighted or blinking lamp, a lighting/blinking time, or a lighting/blinking pattern.

According to the invention, it is possible to provide the injection molding machine provided with the signal lamp capable of manually or automatically elevating the signal lamp in the height direction and of ensuring the height necessary for the signal lamp while avoiding the interference between the signal lamp and a peripheral object.

BRIEF DESCRIPTION OF THE DRAWINGS

The above and other object and the features of the present invention will be apparent from the following description of embodiments with reference to the accompanying drawings, in which:

FIG. 5B is a diagram illustrating a state where the elevation type signal lamp is elevated in response to the operation state of the injection molding machine and illustrating a state where the manipulation power supply is turned on.

DETAILED DESCRIPTION OF THE PREFERRED EMBODIMENTS

Figure 1A:
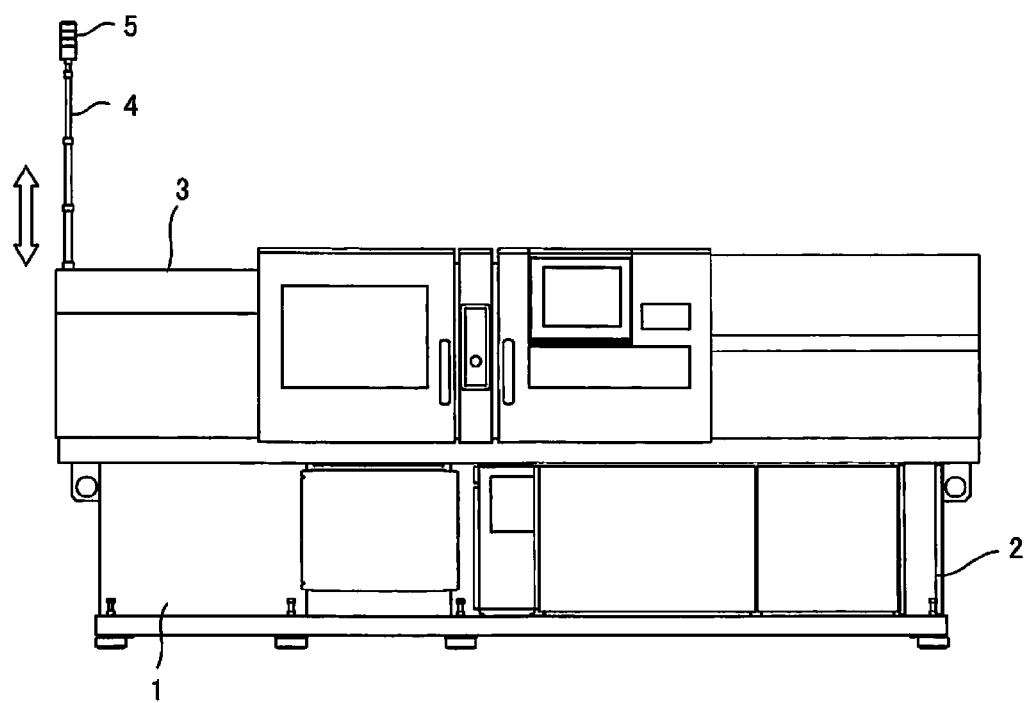
FIG. 1A is a front view of an injection molding machine provided with a signal lamp and illustrates a state where a signal lamp is moved upward.
Figure 1B:
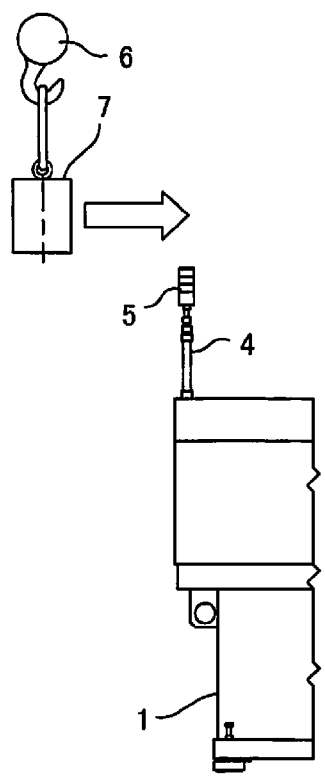
FIG. 1B is a side view of the injection molding machine of FIG. 1A and illustrates a state where the signal lamp is moved downward.

FIGS. 1A and 1B are diagrams illustrating an injection molding machine provided with a signal lamp. FIG. 1A is a diagram in which the injection molding machine is viewed from the front side and illustrates a state where a signal lamp 5 is moved upward. FIG. 1B is a diagram in which the injection molding machine is viewed from the side surface thereof and illustrates a state where the signal lamp 5 is moved downward.

An injection molding machine 1 includes an injection unit and a die clamping unit provided on a base 2. The injection molding machine 1 is controlled by a controller (not illustrated). The injection unit and the die clamping unit are covered by a cover 3. An elevation unit 4 provided with the signal lamp 5 is attached to the surface of the cover 3 of the injection molding machine 1.

The elevation unit 4 may be attached to the cover 3 of the injection molding machine 1 in a removable or fixed manner. The elevation unit 4 may manually or automatically elevate the signal lamp 5. For example, the elevation unit 4 is shortened to move the signal lamp 5 downward so that a carrying object 7 such as a die carried by a carrier 6 such as a crane does not collide with or contact the signal lamp 5 (see FIG. 2A). Further, in a state where the signal lamp 5 does not collide with or contact the carrying object 7, the elevation unit 4 is lengthened to locate the signal lamp 5 at the upper position (see FIG. 2B). In this way, when the elevation unit 4 is lengthened or shortened, the height of the signal lamp 5 may be changed.

The signal lamp 5 may display the operation state of the injection molding machine 1, and may display the operation state of the injection molding machine by changing the color of a lighted or blinking lamp, the lighting/blinking time, or the lighting/blinking pattern. The injection molding machine 1 is connected to the signal lamp 5 by a power supply cable (not illustrated), and may show a display based on the operation state in accordance with the instruction from the controller of the injection molding machine 1.

Figure 2A:
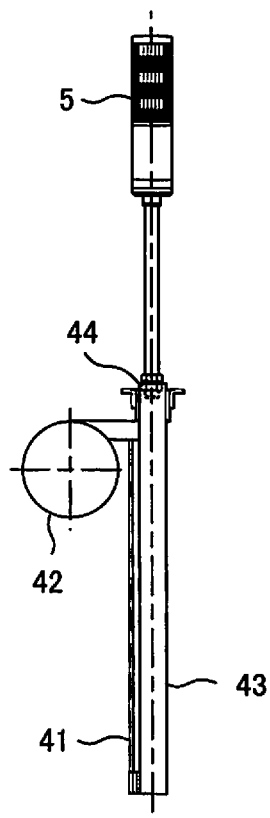
FIG. 2A is a diagram illustrating a state where the signal lamp is moved downward by shortening an elevation unit illustrated in FIG. 1A.
Figure 2B:
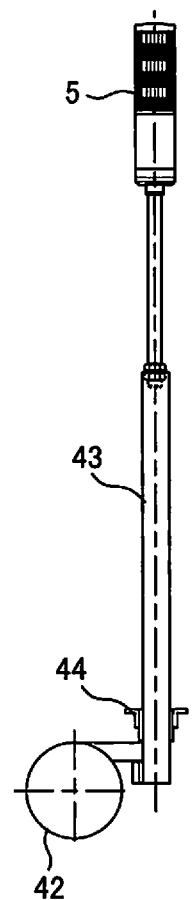
FIG. 2B is a diagram illustrating a state where the signal lamp is moved upward by lengthening the elevation unit illustrated in FIG. 1A.

FIGS. 2A and 2B are diagrams illustrating the signal lamp. FIG. 2A illustrates a state where the signal lamp 5 moves downward and FIG. 2B illustrates a state where the signal lamp 5 moves upward.

As illustrated in FIGS. 2A and 2B, the elevation unit 4 includes a wire 41, a wire winding portion 42, an elevation member 43, and a sliding support member 44. The elevation member 43 may be elevated while being guided by the sliding support member 44. The signal lamp 5 is fixed to one end at the upper side of the elevation member 43. Further, one end of the wire 41 is fixed to one end at the lower side of the elevation member 43 and the other end of the wire 41 is fixed to the wire winding portion 42.

The wire winding portion 42 may be a manual winding device or may be driven by a driving device such as an electric motor. When the wire winding portion 42 is driven by the electric motor, the wire winding operation may be performed in accordance with the instruction from the injection molding machine 1 or the wire winding operation may be performed by controlling the electric motor of the wire winding portion 42 using a controller independent from the injection molding machine 1. The controller of the injection molding machine 1 controls the wire winding operation by controlling the driving of the wire winding portion 42 of the elevation unit 4.

In the invention, when the wire 41 is wound by the wire winding portion 42, the elevation member 43 moves upward. Then, when the wire 41 is released by the wire winding portion 42, the elevation member 43 moves downward. In order to move the elevation member 43 downward, the wire 41 may be wound again by the wire winding portion 42. Precisely, the wire winding operation indicates the operation of moving the elevation member 43 upward. However, in the present specification, both the upward and downward moving operations of the elevation member 43 will be referred to as the wire winding operation.

Figure 3A:
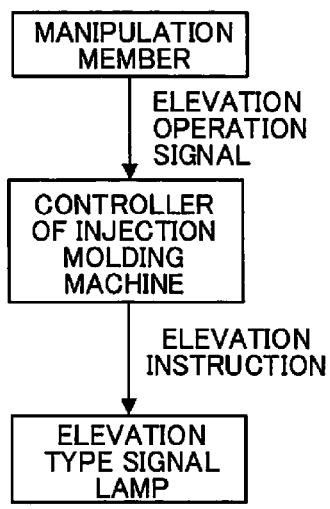
FIG. 3A is a diagram illustrating a procedure of elevating the signal lamp by a wire winding control unit of the injection molding machine.
Figure 3B:
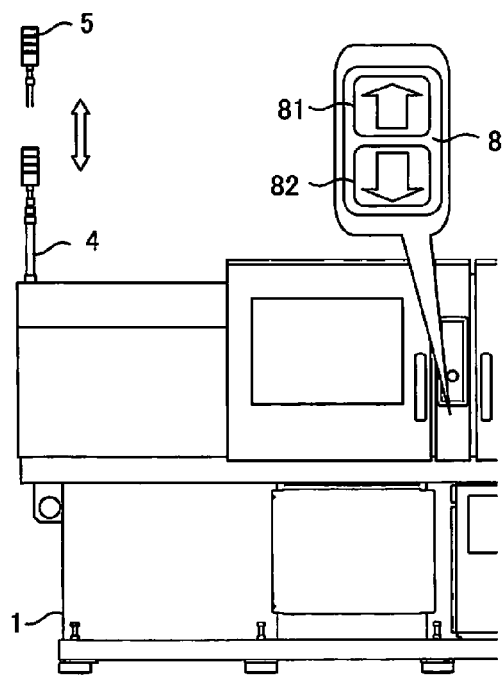
FIG. 3B is a diagram illustrating a state where the injection molding machine is provided with a manipulation button for instructing the wire winding control unit to elevate the signal lamp.

FIGS. 3A and 3B are diagrams illustrating a wire winding control unit of the injection molding machine. Here, FIG. 3A is a flowchart illustrating a procedure of elevating the signal lamp 5 by the wire winding control unit, and FIG. 3B is a diagram illustrating a state where the injection molding machine 1 is provided with a manipulation button 8 as a manipulation member for instructing the wire winding control unit to elevate the signal lamp 5.

As illustrated in FIG. 3B, the injection molding machine 1 includes the manipulation button 8 as the manipulation member for inputting the instruction of elevating the signal lamp 5. The manipulation button 8 includes an up button 81 which locates the signal lamp 5 at the upper end position and a down button 82 which locates the signal lamp 5 at the lower end position.

The wire winding control unit outputs a wire winding control signal for controlling the wire winding operation to the wire winding portion. When the wire winding portion receives the wire winding control signal output from the wire winding control unit, the driving device performs the wire winding operation by the wire winding portion, in consequence, the height of the elevation unit 4 changes. That is, as illustrated in FIG. 3A, an elevation operation signal which is input by the manipulation member (the manipulation button 8) is input to the controller (including the wire winding control unit) of the injection molding machine 1. The controller of the injection molding machine 1 outputs an elevation instruction to the elevation unit (the driving device of the wire winding device). The wire winding device moves the signal lamp 5 up and down in accordance with the elevation instruction.

Figure 4:
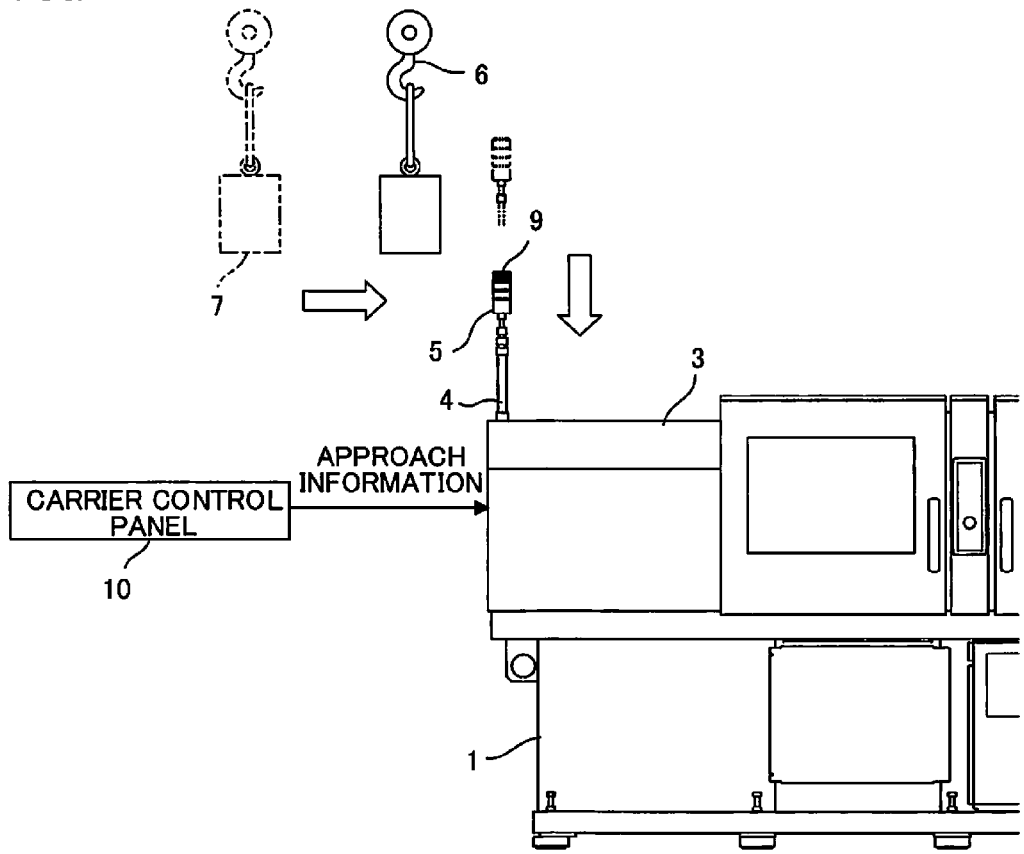
FIG. 4 is a diagram illustrating a state where a detector for detecting the approach of an interference object to the signal lamp is attached to the signal lamp.

FIG. 4 is a diagram illustrating a state where a detector that detects the approach of the interference object to the signal lamp 5 is attached to the signal lamp 5 and the elevation unit 4 is automatically moved downward when the detector detects the approach of the interference object.

A sensor 9 as the detector that detects an approach of a carrying object 7 such as a die is attached to the signal lamp 5. When the sensor 9 detects a state where the carrying object 7 approaches the signal lamp 5, the sensor 9 transmits the approach information of the carrying object 7 to the controller of the injection molding machine 1. The controller that receives the approach information controls the driving of the wire winding portion 42 to move the signal lamp 5 downward in order to prevent the signal lamp 5 from colliding with or contacting the carrying object 7.

In addition, as for the control of elevating the signal lamp 5, the signal lamp 5 may be elevated by using the approach information obtained from the controller of the injection molding machine 1 that receives a signal from the controller of the carrier 6 carrying the carrying object 7 or a signal input from a carrier control panel 10 as the approach information.

Figure 5A:
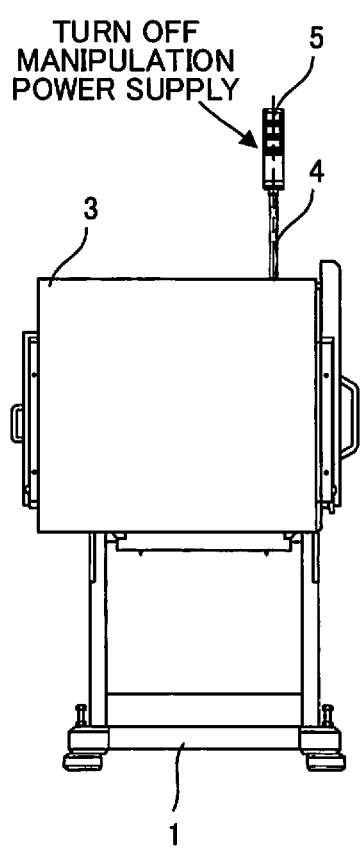
FIG. 5A is a diagram illustrating a state where an elevation type signal lamp is elevated in response to the operation state of the injection molding machine and illustrating a state where a manipulation power supply is turned off.
Figure 5B:
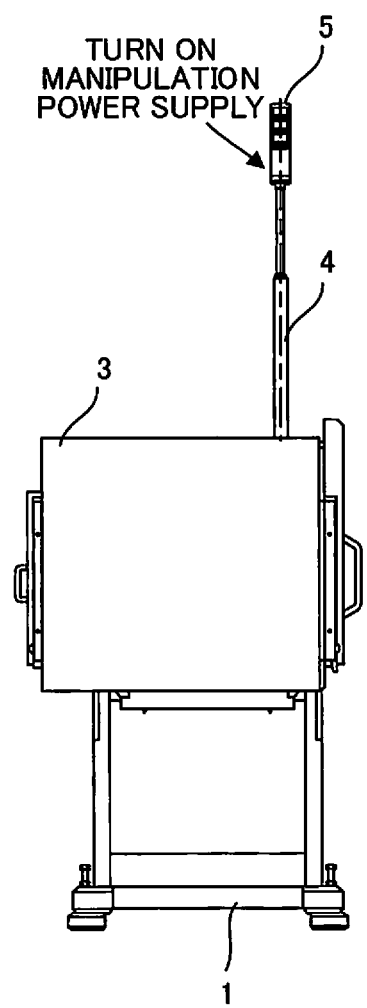

FIGS. 5A and 5B are diagrams illustrating a state where an elevation type signal lamp is elevated in response to the operation state of the injection molding machine. Here, FIG. 5A illustrates a state where a manipulation power supply is turned off and FIG. 5B illustrates a state where the manipulation power supply is turned on.

The embodiment illustrated in FIGS. 5A and 5B is characterized in that the wire winding control signal is changed in response to the operation state of the injection molding machine and the elevation member 43 is elevated to a height position corresponding to the operation state. For that reason, the injection molding machine 1 includes a position detector (not illustrated) such as a limit switch or an encoder that detects the height position of the signal lamp 5. The height position of the signal lamp 5 may be specified by using a position detector (not illustrated) provided in the driving device of the wire winding portion 42.

As described above, the injection molding machine provided with the signal lamp of the invention has a structure in which the signal lamp may be manually or automatically elevated in the height direction without any specific construction. Thus, the interference between the signal lamp and a peripheral object may be avoided, and the height necessary for the signal lamp may be easily ensured. Further, since the signal lamp height is adjusted in accordance with the operation state of the injection molding machine, various operation states of the injection molding machine may be visually recognized even at a position far from the injection molding machine.

The invention claimed is:
1. An injection molding machine, comprising:
a signal lamp configured to display an operation state of the injection molding machine; and
an elevation unit configured to elevate the signal lamp,
wherein a height of the signal lamp is adjustable by an elevation operation of the elevation unit,
the elevation unit includes a wire, a wire winding portion, an elevation member, and a sliding support member,
one end of the wire is fixed to the wire winding portion and the other end of the wire is fixed to the elevation member,
the signal lamp is fixed to the elevation member,
the elevation member is attached to the sliding support member so as to be elevated while being guided by the sliding support member, and
the elevation member is configured to be elevated while being guided by the sliding support member through a wire winding operation of the wire winding portion.
2. The injection molding machine according to claim 1, wherein the wire winding portion includes a driving device configured to perform the wire winding operation.
3. The injection molding machine according to claim 2, further comprising a wire winding control unit configured to control the wire winding operation through the driving device.
4. The injection molding machine according to claim 3, further comprising a detection unit configured to detect the approach of an interference object to the signal lamp, wherein the elevation member is configured to be moved downward when the detection unit detects the approach of the interference object.
5. The injection molding machine according to claim 3, wherein the wire winding control unit is configured to elevate the member to a height position in response to the operation state of the injection molding machine.
6. The injection molding machine according to claim 3, further comprising a height position detection unit configured to detect the height position of the signal lamp.
7. The injection molding machine according to claim 1, wherein the signal lamp is adapted to display the operation state of the injection molding machine by changing the color of a lighted or blinking lamp, a lighting/blinking time, or a lighting/blinking pattern.

* * * * *